US006385730B2

(12) United States Patent
Garrison

(10) Patent No.: US 6,385,730 B2
(45) Date of Patent: *May 7, 2002

(54) SYSTEM AND METHOD FOR RESTRICTING UNAUTHORIZED ACCESS TO A DATABASE

(75) Inventor: Greg B. Garrison, Woodstock, GA (US)

(73) Assignee: FiWare, Inc., Norcross, GA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/146,411

(22) Filed: Sep. 3, 1998

(51) Int. Cl.[7] .......................... G06F 15/16; G06F 11/30; G06F 12/14; H04L 9/00; H04L 9/32
(52) U.S. Cl. ........................................ 713/202; 709/217
(58) Field of Search ................................. 713/202, 201, 713/200; 707/9; 711/164; 709/217, 218, 219

(56) References Cited

U.S. PATENT DOCUMENTS

| | | | |
|---|---|---|---|
| 4,817,050 A | 3/1989 | Komatsu et al. | 364/900 |
| 4,891,785 A | 1/1990 | Donohoo | 364/900 |
| 5,081,678 A | 1/1992 | Kaufman et al. | 380/21 |
| 5,196,840 A | 3/1993 | Leith et al. | 340/825.3 |
| 5,233,655 A | 8/1993 | Shapiro | 380/21 |
| 5,253,341 A | 10/1993 | Rozmanith et al. | 395/200 |
| 5,349,675 A | 9/1994 | Fitzgerald et al. | 395/800 |
| 5,416,917 A | 5/1995 | Adair et al. | 395/500 |

(List continued on next page.)

OTHER PUBLICATIONS

"Network–vs. Host–based Intrusion Detection, A Guide to Intrusion Detection Technology", Internet Security Systems, Oct. 2, 1998, pp. 2–10.

"Getting Past the Cyberspace Hype: Adaptive Security—A Model Solution—A Solution Model", Internet Security Systems, Jun. 15, 1997, pp. 1–24.

"Securing Operating Plaftorms: A solution for tightening system security", Internet Security Systems, Jan. 1997, pp. 1–11.

Simplifying Enterprise Application Integration, SmartDB Corporation, 1998, http://www.smartdb.com/ pp. 1–13, Oct. 23, 1998.

"One–To–One Powerhouse Broadvision, Inc. Endorses Two Key Online Privacy and Security Initiatives", Broadvision, http://www.broadvision.com, Oct. 22, 1998.

"Introduction to Kerberos 5", National Center for Supercomputing Applications, http://www.ncsa.uiuc.edu pp. 107, Oct. 27, 1998.

"Web Administrator 2.0 for Microsoft Windows NT Server 4.0", Microsoft, http://www.microsoft.com pp. 1–2, Oct. 22, 1998.

*Primary Examiner*—Norman M. Wright
*Assistant Examiner*—Christopher Revak
(74) *Attorney, Agent, or Firm*—Jon E. Holland

(57) ABSTRACT

A secure client/server system provides remote access to a database system without allowing unauthorized users to access data stored within the database system. A client computer (client) establishes communication with server computer (server) and transmits a user password to the server. The server receives the user password and translates the user password into an alias or different password. When the client submits a request for data contained in the database system, the server accesses a database system associated with the server using the alias password. The database system allows the server to access information within the database system based on the alias password. Since the database system recognizes the alias password instead of the user password, only attempts to access the database via the server (after passing the security measures in place at the server) should be successful.

23 Claims, 5 Drawing Sheets

U.S. PATENT DOCUMENTS

| | | | |
|---|---|---|---|
| 5,446,740 A | 8/1995 | Yien et al. | 370/110.1 |
| 5,471,611 A | 11/1995 | McGregor | 395/600 |
| 5,550,976 A | 8/1996 | Henderson et al. | 395/200.06 |
| 5,581,749 A | 12/1996 | Hossain et al. | 395/600 |
| 5,628,011 A | 5/1997 | Ahamed et al. | 395/610 |
| 5,649,103 A | 7/1997 | Datta et al. | 395/200.03 |
| 5,664,173 A | 9/1997 | Fast | 395/604 |
| 5,701,461 A | 12/1997 | Dalal et al. | 395/604 |
| 5,706,434 A | 1/1998 | Kremen et al. | 395/200.09 |
| 5,708,832 A | 1/1998 | Inniss et al. | 395/800 |
| 5,710,918 A | 1/1998 | Lagarde et al. | 395/610 |
| 5,713,018 A | 1/1998 | Chan | 395/610 |
| 5,737,592 A | 4/1998 | Nguyen et al. | 395/604 |
| 5,751,812 A * | 5/1998 | Anderson | 713/155 |
| 5,752,242 A | 5/1998 | Havens | 707/3 |
| 5,768,381 A | 6/1998 | Hawthorne | 380/21 |
| 5,768,503 A * | 6/1998 | Olkin | 713/201 |
| 5,826,016 A * | 10/1998 | Ito et al. | 713/202 |
| 5,862,323 A | 1/1999 | Blakley, III et al. | 284/188.01 |
| 5,864,843 A | 1/1999 | Carino, Jr. et al. | 707/4 |
| 5,944,824 A * | 8/1999 | He | 713/202 |
| 5,949,882 A * | 9/1999 | Angelo | 713/185 |
| 5,953,422 A * | 9/1999 | Angelo et al. | 713/185 |
| 5,956,400 A | 9/1999 | Chaum et al. | 380/4 |
| 5,960,084 A * | 9/1999 | Angelo | 713/185 |
| 6,000,033 A * | 12/1999 | Kelley et al. | 713/201 |
| 6,006,333 A * | 12/1999 | Nielsen | 713/202 |
| 6,047,072 A | 4/2000 | Field et al. | 380/283 |
| 6,088,699 A | 7/2000 | Gampper et al. | 707/10 |
| 6,088,700 A | 7/2000 | Larsen et al. | 707/10 |
| 6,182,229 C1 * | 1/2001 | Nielsen | 713/202 |

* cited by examiner

SYSTEM AND METHOD FOR RESTRICTING UNAUTHORIZED ACCESS TO A DATABASE

BACKGROUND OF THE INVENTION

1. Field of the Invention

The present invention generally relates to data security systems and, in particular, to a system and method for preventing unauthorized access of a database that can be accessed remotely by authorized users.

2. Related Art

Current database systems store a variety of information, and it is often desirable to keep the information stored within many database systems private. Therefore, in many applications, it is important to allow only authorized users to access the information stored within a database system. Furthermore, it is often desirable for authorized users to access the information within the database system from remote locations. However, allowing access to database systems from remote locations presents certain security concerns. For example, it usually becomes easier for unauthorized users, sometimes referred to as "hackers," to access information within the database system when remote access of the database system is allowed for authorized users.

In this regard, if access to the database system is only provided through devices at the premises of the database system (i.e., remote access is not allowed), then access to the premises and, hence, the database system can be effectively limited to authorized users of the database system. However, if access to the database system from remote locations is allowed, then it becomes easier for unauthorized users to gain access to the database system.

For example, in many prior art systems, a server at the premises of the database system is utilized to enable remote access to the database system. To retrieve data from the database system remotely, an authorized user establishes communication with the server, and the server verifies that the user is an authorized user. For example, the server typically requires the user to enter a valid password before allowing the user to connect to the database system. If the user enters a valid password, then the server allows the user's computer (the client) to connect to the database system. The client then queries the database system through Structured Query Language (SQL) queries (or other types of queries) in order to retrieve the desired data from databases within the database system.

Many times, the user is only authorized to access certain data within the database system. Therefore, the database system typically includes security features that restrict the user's access to certain data within the database system based on the user's password, which identifies the user. If the user submits an acceptable query (i.e., a query for information that is within the user's authorized data), then the database system retrieves the requested data and returns it to the client computer via the server. Remote access to at least a portion of the database system is thereby enabled.

Since remote access to the server is necessary to allow the database system to be accessed at remote locations by authorized users, hackers typically are capable of establishing communication with the server associated with the database system. Once communication with the server is established, hackers often are prevented from connecting with the database system primarily through the security measures in place at the server that verify a user as being an authorized user. However, the security measures at the server are not always adequate.

For example, a hacker might discover a valid password through a variety of hacking methods. One such method could include the interception of data communications between the server and an authorized user to discover a valid password. Even if the communications between the server and the authorized user are encrypted, current encryption techniques can sometimes be broken and deciphered by hackers. Therefore, a hacker can use the password to gain connectivity with the database system. Once connected to the database system, the hacker can then access any information within the database accessible to the password. Furthermore, the hacker can attempt to defeat the security measures in place at the database system to gain access to other information in the database system as well.

Accordingly, providing remote access to database systems allows hackers, through a variety of methods, certain opportunities to access the data within the database system. As a result, many database systems containing sensitive or important information are either restricted from remote access entirely or allow remote access with the risk that a potential hacker can break into the database system and retrieve or manipulate the data therein.

Thus, a heretofore unaddressed need exists in the industry for providing a more secure system and method of allowing remote access to a database system.

SUMMARY OF THE INVENTION

The present invention overcomes the inadequacies and deficiencies of the prior art as discussed herein. In general, the present invention provides a system and method for securely accessing a database from a remote location.

The present invention utilizes a client computer (client), a server computer (server), and a database system. The client establishes communication with the server and transmits a user password to the server. The server receives the user password and translates the user password into an alias or different password. When the client submits a request for data contained in the database system, the server accesses the database system using the alias password. The database system allows the server to access information within the database system based on the alias password. Since the database system recognizes the alias password instead of the user password, only attempts to access the database via the server (after passing the security measures in place at the server) should be successful.

In accordance with another feature of the present invention, the server maintains a password table. The password table includes a plurality of entries. Each entry correlates a respective user password with a respective alias password. The server accesses the entry in the password table corresponding with the user password and retrieves the alias password from the entry.

In accordance with another feature of the present invention, the server transmits the user password to a remote server. The remote server translates the user password into a second alias or different password. The remote server then accesses a remote database system associated with the remote server via the second alias password.

The present invention has many advantages, a few of which are delineated hereafter, as mere examples.

An advantage of the present invention is that a database system can be remotely accessed.

Another advantage of the present invention is that unauthorized access of a remotely accessible database system can be prevented.

Another advantage of the present invention is that a database system can be remotely accessible without allowing unauthorized users to connect with the database system.

Another advantage of the present invention is that information within a plurality of databases located remotely from each other can be accessed in a secured environment.

Another advantage of the present invention is that an unauthorized user having a valid password can be identified as an unauthorized user by the database system.

Another advantage of the present invention is that a remotely accessible database system can be secured even if encrypted messages between the client and server are intercepted and deciphered during a data session between the client and server.

Other features and advantages of the present invention will become apparent to one skilled in the art upon examination of the following detailed description, when read in conjunction with the accompanying drawings. It is intended that all such features and advantages be included herein within the scope of the present invention, as is defined by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE INVENTION

Figure 1:
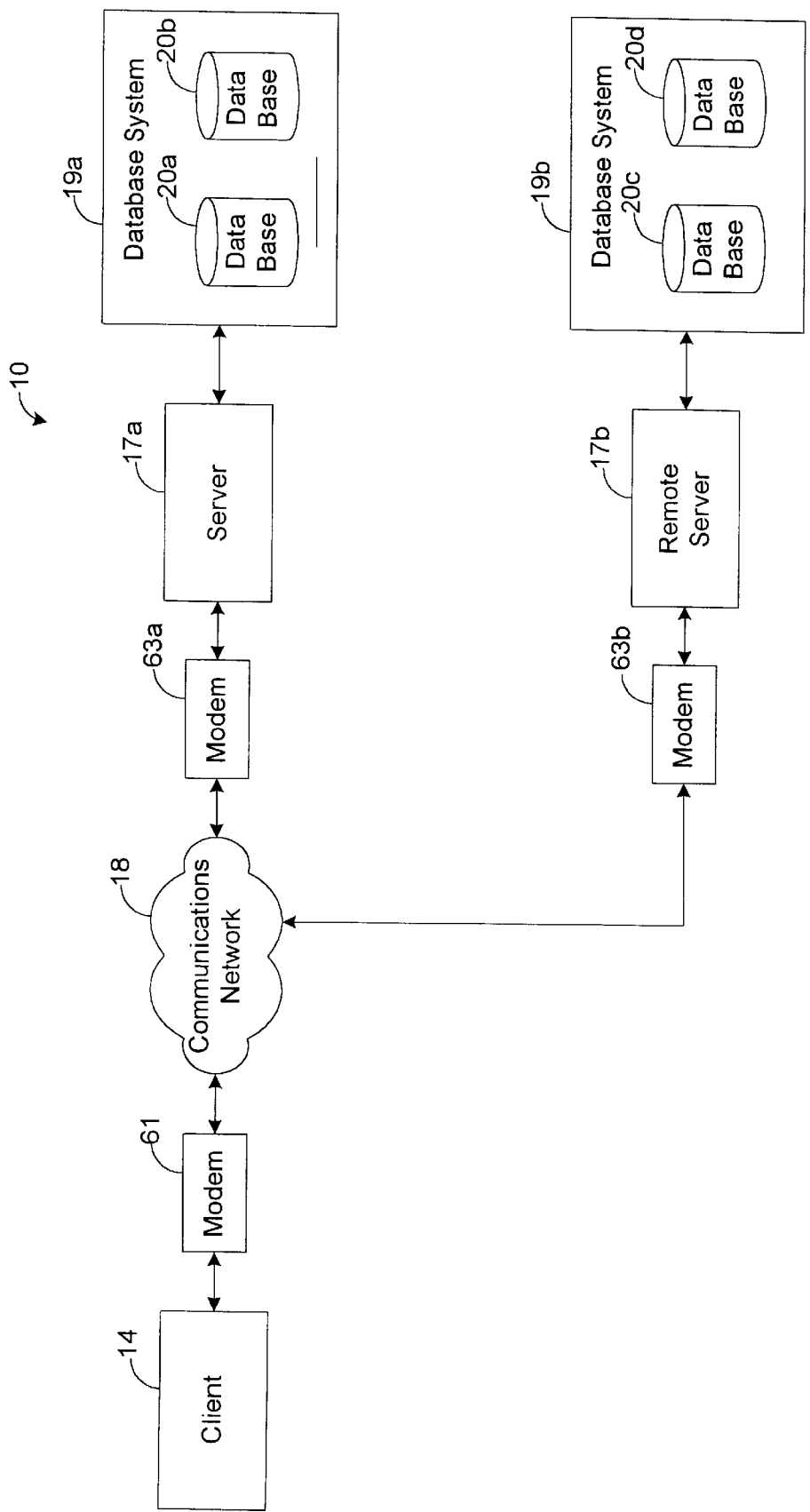
FIG. 1 is a block diagram illustrating a client/server system in accordance with the present invention.

FIG. 1 depicts a client/server system 10 illustrating the principles of the present invention. Referring to FIG. 1, a client 14 is configured to communicate with a server 17a via communications network 18. The client 14 is preferably a computer system located remotely from the server 17a, which is preferably a computer system as well. As used herein, the terms "remotely located" or "remote location" shall refer to a location separated from the premises of a server 17a by an unsecure connection. An unsecure connection is any connection accessible by a hacker or unauthorized user. Examples of unsecure connections are, but are not limited to, Internet connections, Publicly Switched Telephone Network (PSTN) connections, cellular connections etc. The communications network 18 can comprise any conventional communications network or combinations of networks such as, for example (but not limited to), the PSTN, a cellular network, etc. Furthermore, the communications network 18, along with the client 14 and server 17a, may employ any protocol or combinations of protocols suitable for communicating information between the client 14 and the server 17a.

The server 17a is preferably associated with and connected to a database system 19a having at least one database 20a or 20b. The database system 19a is preferably any database system known in the art. Therefore, information stored within each database 20a and 20b can be accessed by the server 17a through known techniques. The database system 19a is preferably located on a premises of the server 17a.

Figure 2:
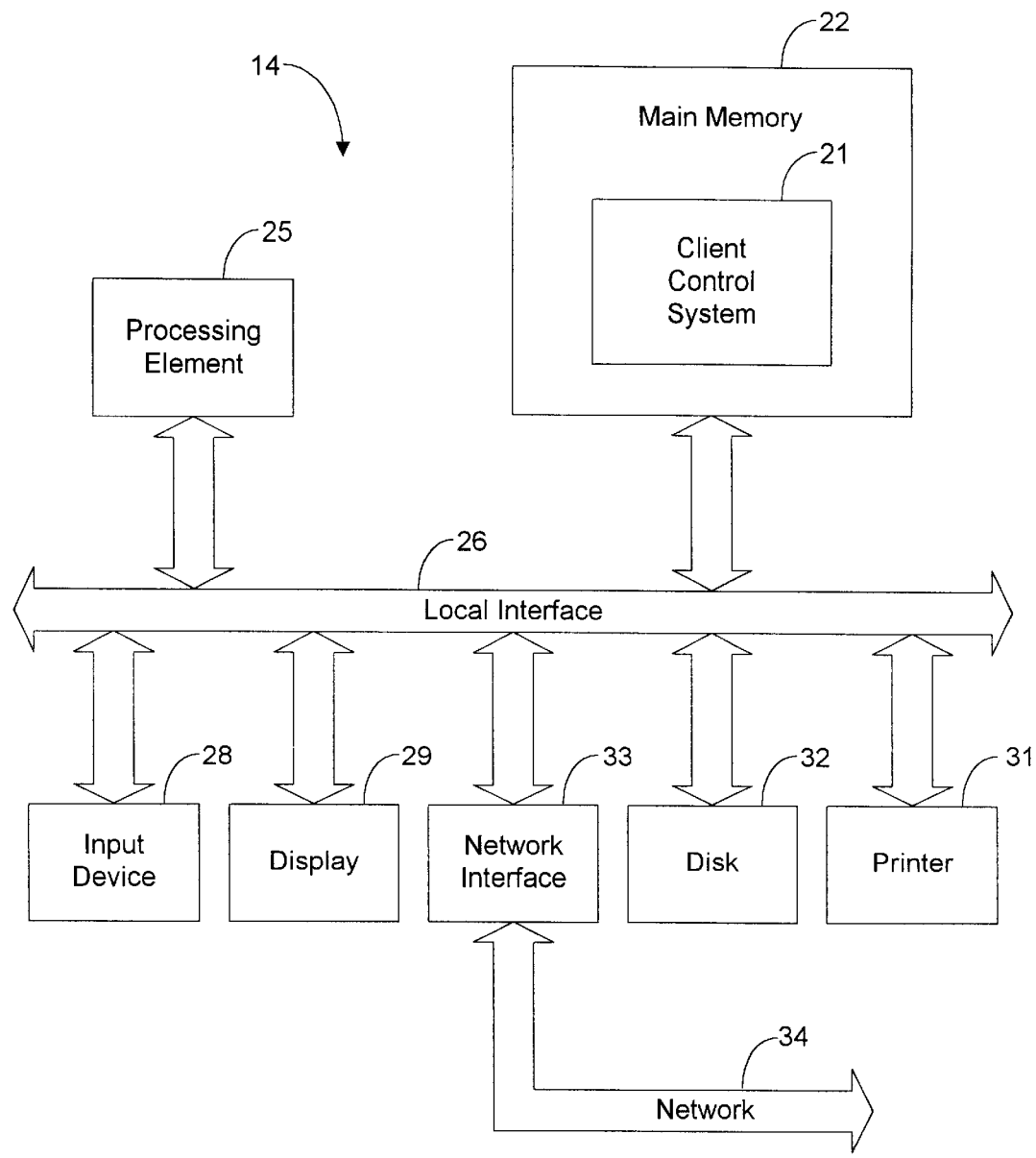
FIG. 2 is a block diagram illustrating a client computer system in accordance with the principles of the present invention.

Referring now to FIG. 2, the client 17a preferably includes a control system 21 for controlling the operation of the client 14. The client control system 21 along with its associated methodology is preferably implemented in software and stored in main memory 22 of the client 14. Note that the client control system 21 can be stored and transported on any computer-readable medium for use by or in connection with a computer-readable system or method. In the context of this document, a computer-readable medium is an electronic, magnetic, optical, or other physical device or means that can contain or store a computer program for use by or in connection with a computer-related system or method. As an example, the client control system 21 may be magnetically stored and transported on a conventional portable computer diskette.

The preferred embodiment of the client 14 of FIG. 2 comprises one or more conventional processing elements 25, such as a digital signal processor (DSP), that communicate to and drive the other elements within the client 14 via a local interface 26, which can include one or more buses. Furthermore, an input device 28, for example, a keyboard or a mouse, can be used to input data from a user of the client 14, and a screen display 29 or a printer 31 can be used to output data to a user. A disk storage mechanism 32 can be connected to the local interface 26 to transfer data to and from a nonvolatile disk (e.g., magnetic, optical, etc.). The client 14 can be connected to a network interface 33 that allows the client 14 to exchange data with a network 34.

Figure 3:
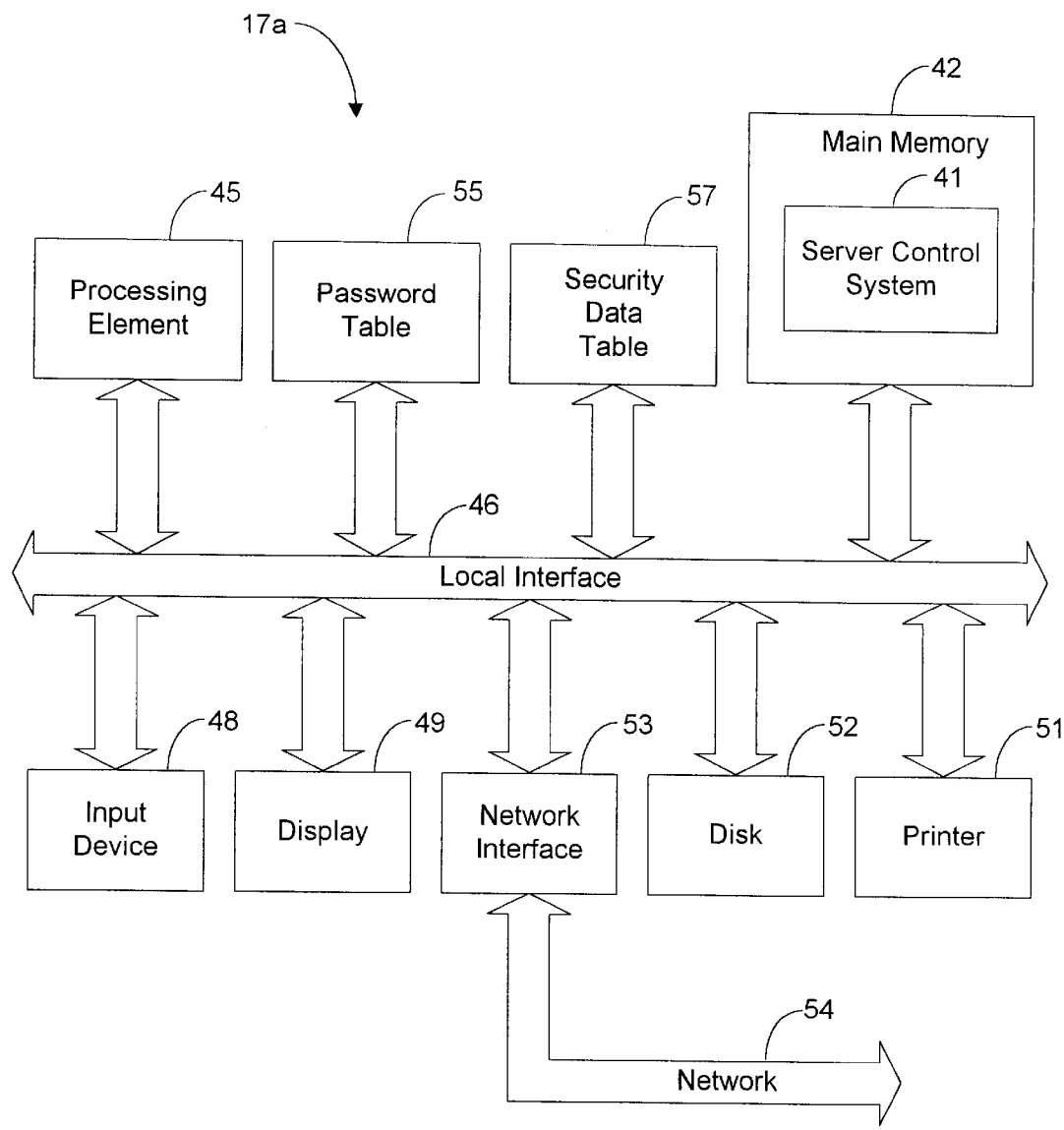
FIG. 3 is a block diagram illustrating a server computer system in accordance with the present invention.

Furthermore, as shown by FIG. 3, the server 17a, as does the nearly identical server 17b, preferably comprises a computer system similar to the client 14. Similar to the client 14, a control system 41 associated with the server 17a preferably controls the operations of the server 17a. The server control system 41 along with its associated methodology is preferably implemented in software and stored in main memory 42 of the server 17a. Note that the server control system 41 can be stored and transported on any computer-readable medium for use by or in connection with a computer-readable system or method.

Similar to the client 14, the preferred embodiment of the server 17a comprises one or more conventional processing elements 45, such as a digital signal processor (DSP), that communicate to and drive the other elements within the server 17a via a local interface 46, which can include one or more buses. Furthermore, an input device 48, for example, a keyboard or a mouse, can be used to input data from a user of the client 14, and a screen display 49 or a printer 51 can be used to output data to a user. A disk storage mechanism 52 can be connected to the local interface 46 to transfer data to and from a nonvolatile disk (e.g., magnetic, optical, etc.). The server 17a can be connected to a network interface 53 that allows the server 17a to exchange data with a network 54. Furthermore, the server 17a preferably maintains a password table 55 and a security data table 57 that can be accessed by the server control system 41 via local bus 46. The password table 55 and security data table 57 will be discussed in further detail hereinbelow.

Referring again to FIG. 1, the client 14 is configured to establish communication with the server 17a through any suitable technique known in the art. For example, the client 14 can be connected to a modem 61 which establishes communication with a modem 63a connected to the server 17a. Once communication between the modems 61 and 63a is established, the client 14 can communicate with the server 17a via communications network 18 and modems 61 and 63a. However, it is sufficient for the purposes of the present invention that the client 14 be capable of communicating with the server 17a, and one skilled in the art should realize that communications devices other than modems 61 and 63a (including modem 63b when communication with modem 17b is established) may be used to establish communication between client 14 and server 17a. Therefore, modems 61, 63a, and 63b are not necessary to implement the principles of the present invention.

After establishing communication with the server 17a, the server 17a is designed to transmit a new encryption key to the client 14. As known in the art, the encryption key can be used to encrypt and decrypt data through known encryption techniques, such as DES encryption, for example. In order to securely transmit the new encryption key to client 14, the new encryption key is preferably encrypted through known encryption techniques (such as RSA encryption, for example) by the server 17a before transmitting the key to the client 14.

In this regard, the client 14 is designed to have a public encryption key and a corresponding private encryption key pursuant to RSA encryption standards. The client 14 is configured to transmit the public encryption key to the server 17a when communication between the client 14 and server 17a are established. In response, the server 17a is designed to generate the new encryption key and to encrypt the new encryption key with the public key supplied by the client 14. The server 17a is then designed to transmit the encrypted new encryption key to the client 14 which decrypts the new encryption key with the private key. Thereafter, both the client 14 and the server 17a are designed to encrypt and decrypt all data transmitted therebetween with the new encryption key pursuant to known encryption/decryption techniques, such as DES encryption/decryption techniques, for example.

Since a new encryption key is utilized for each new data session, attempts by unauthorized users to gain access to the database system 19a are frustrated. In this regard, the server 17a identifies a user through the log name and password transmitted to the server 17a as described hereinabove. If this data is not encrypted with a different encryption key (i.e., a new encryption key unique to each data session), then the log name and password are transmitted in the same form for each data session. Therefore, hackers can more easily break the encryption scheme and/or "spoof" the server 17a into allowing the hacker to gain access to the database system 19a. The hackers can "spoof" the server 17a by intercepting the encrypted log name and password and transmitting a copy of the encrypted log name and password to the server 17a after establishing a data session with the server 17a.

However, using a new encryption key for each data session causes the same data (e.g., the log name and the password) to appear in a different form for each data session. Therefore, it is more difficult to break the encryption scheme (i.e., discover the encryption key used to decrypt the data), and it becomes more difficult to spoof the server 17a, since the server 17a is expecting a different form of the log name and password for each data session. Consequently, attempts by hackers to gain access to the database system 19a are frustrated by encrypting data with a new encryption key for each data session between the client 14 and the server 17a.

As an alternative to encrypting the new encryption key with a public encryption key supplied by the client 14, the new encryption key can be encrypted according to a standard algorithm by the server 17a before being communicated to the client 14. The client 14 is preferably aware of the standard algorithm and is configured to decrypt the data sent from the server 17a via the standard algorithm in order to determine the new encryption key. For example, the server 17a can be configured to transmit a plurality of encryption keys along with an index indicating which of the keys is the new encryption key for the data session. The client 14 can be configured to process the index via the standard algorithm in order to determine which is the new encryption key.

As an example, the index could be a code word indicating the placement of the new key within the plurality of keys (e.g., indicating that the new key will be the tenth key transmitted by the server 17a). In this case, the client 14 is configured to decode the coded index in order to determine the placement of the new encryption key. In this regard, the client 14 may include a predetermined table of code words in memory 22 (FIG. 2) where each code word is correlated with a particular placement value. Accordingly, the client 14 can be configured to access the data table and to translate the coded index into the placement value of the new encryption key. Other algorithms may be employed for determining the new encryption key without departing from the principles of the present invention.

It should be noted that other types of encryption methodologies may be employed without departing from the principles of the present invention. Regardless of the encryption methodology utilized, it should be desirable to encrypt data with a new or different key for each data session, as described hereinabove.

After determining the new encryption key, the client 14 is designed to use the new encryption key to encrypt and transmit a predefined password and log name to the server 17a. The predefined password is preferably unique to the user of client 14, and the password and log name together can be used to identify the user. The server 17a is configured to receive the log name and the password and to decrypt the log name and the password with the new encryption key. Then, the server 17a is configured to translate the password into a new password (an "alias" password) that identifies the user of the client 14 to the server 17a. In order to implement the translation, the server 17a preferably maintains a password table 55 (FIG. 3). The password table 55 preferably includes an entry for each authorized user of the system 10. Each predefined password associated with a user is correlated with a particular alias password and with the log name of the user associated with the predefined password. Therefore, through techniques known in the art, the server 17a can retrieve the alias password from the password table 55 based on the predefined password and log name supplied by the user of the client 14.

After receiving the password from the client 14, the server 17a is configured to identify the user of the client 14 via the password and log name received by the server 17a. If the password supplied by the client 14 is not in the password table 55 or if the log name supplied by the client 14 does not match the log name associated with the password in the password table 55, then server 17a is designed to identify the user as an unauthorized user. The server 17a preferably sends a message to the client indicating the nature of the problem and either terminates the data session or allows the user to reenter a new log name and/or password.

Once the server 17a has identified the user of client 14 as an authorized user, the client 14 is configured to encrypt a request for data using the new encryption key and to transmit the encrypted request for data to the server 17a. The request for data can be of any form or can be in accordance with any protocol known to the server 17a. In the preferred embodiment, the request for data is a predetermined data word (i.e., a code word) known to the server 17a.

It should be noted that encryption of the request for data is not necessary for implementation of the present invention. This is especially true when the request is a predetermined code word, since an unauthorized user should be unfamiliar with the code word and therefore unable to extract any useful information from the request. However, encryption of the request makes it more difficult for unauthorized users to retrieve information from the database system 19a in cases where the unauthorized user is able to spoof the server 17a or to discover a valid password. This is because the server 17a will not retrieve any information from the database system 19a unless a valid request is submitted to the server 17a, and encrypting the requests for data makes it more difficult for unauthorized users to discover valid requests for data. Therefore, encryption of the requests for data transmitted from the client 14 is not necessary but helps to ensure the overall security of the system 10.

The server 17a is designed to receive the request for data and to decrypt the request for data using the new encryption key. Then the server 17a is designed to determine whether the information requested by the request for data is accessible to the user (i.e., authorized for viewing by the user). In this regard, the server 17a preferably includes security information that indicates which data within the databases 20a and 20b are accessible to each user. For example, although other embodiments are possible, the security information can be stored in a security data table 57 in which each entry of the security data table 57 corresponds to a user and indicates which information is accessible to the user. Therefore, through techniques known in the art, the server 17a is designed to retrieve the entry in the security data table 57 corresponding to the user of client 14. Then, the server 17a is configured to determine whether the information requested by the client 14 is accessible to the user of client 14.

If the server 17a determines that the information requested by the client 14 is inaccessible to the user of the client 14, then the server 17a is configured to discard the request and to send a message to the client 14 indicating that access to the requested information is denied. However, if the server 17a determines that the requested information is accessible to the user of client 14, then the server 17a is configured to query the appropriate database 20a or 20b for the requested information. In this regard, the server 17a is preferably designed to translate the request for data into a structured query language (SQL) query or other known types of queries. As known in the art, structured query language is a database language for querying, updating, and managing databases. Since the server 17a is aware of the information requested by the client 14 via the request for data transmitted from the client 14, the server 17a is able to create an appropriate SQL query or other types of well known queries through query generating techniques known in the art. Therefore, the server 17a is designed to connect to the database system 19a and to submit an appropriate query to retrieve the information requested by the client 14. As will be discussed in further detail hereinafter, the server 17a is preferably configured to utilize the alias password associated with the user of the client 14 when accessing the databases 20a and 20b within database system 19a.

Alternatively, the server 17a can be configured to determine whether the user is authorized to access the requested data after the requested data is retrieved from the database system 19a. For example, in embodiments where the request for data transmitted from the client 14 is an SQL query (or other type of query capable of retrieving data from the database system 19a), it is preferable that the server 17a intercept the data retrieved from database system 19a and analyze the retrieved data for accessibility issues. After consulting the security data table 57, the server 17a is configured to discard any data determined by the server 17a to be inaccessible to the user of client 14.

It should be noted that portions of the data requested by the client 14 may be located in different databases 20a–20d. Furthermore, each of databases 20a–20d may have a different protocol for querying and retrieving data. For example, a portion of the data requested by the client 14 may be located in database 20a, and a portion of the data requested by the client 14 may be located in database 20b, which receives queries and transmits data according to a different protocol than that of database 20a. As an example, database 20a may be an Oracle type database while database 20b may be a Microsoft Access type of database. The server 17a preferably is familiar with the protocols used by both databases 20a and 20b. Therefore, the server 17a generates a first query (pursuant to the protocol utilized by database 20a) to database 20a in order to retrieve a portion of the data requested by the client 14, and the server 17a generates a second query (pursuant to the protocol utilized by database 20b) to database 20b in order to retrieve another portion of the data requested by the client 14. Accordingly, the server 17a is capable of retrieving the data requested by the client 14, even when the requested data is located in different types of databases.

If part of the information requested by the client 14 is located in a remote database system 19b associated with a remote server 17b, the server 17a is designed to create a request for data to be sent to the remote server 17b. Similar to the request for data transmitted from the client 14 to the server 17a, the request for data created by the server 17a can be of any protocol known to the remote server 17b. In the preferred embodiment, the request for data is a data word (i.e., a code word) recognizable to the remote server 17b. To ensure the security of the request, the server 17a may be designed to utilize the same security features utilized by the server 17a in dealing with client 14.

In this regard, the server 17a preferably retrieves data from the remote server 17b in the same way that client 14 retrieves data from the server 17a. Therefore, in response to the data session between the server 17a and the remote server 17b, the server 17a transmits a public encryption key to the remote server 17b. The remote server 17b generates a new encryption key for the data session between the server 17a and the remote server 17b and encrypts the new encryption key with the public key supplied by the server 17a. The remote server 17b transmits the new encryption key to the server 17a, which decrypts the new encryption key with the private key corresponding with the public key sent to the remote server 17b. Thereafter, the servers 17a and 17b encrypt and decrypt all data transmitted therebetween with the new encryption key generated by the remote server 17b.

The server 17a then encrypts the user's password and log name with the new encryption key generated by the remote server 17b and transmits the log name and password to the remote server 17b. The remote server 17b decrypts the password and log name with the new encryption key generated by the remote server 17b to verify that the requests transmitted by the server 17a are associated with an authorized user. The remote server 17b then translates the password into an alias password. The server 17a is designed to encrypt the request for data created by the server 17a and to transmit the request to the remote server 17b. The remote server 17b is configured to decrypt the request with the new key generated by the remote server 17b and to translate the request into an appropriate query, preferably an SQL query.

Like the server 17a, the remote server 17b is then designed to verify that the requested information is accessible to the user. If the user may retrieve the requested data, then the remote server 17b is designed to translate the request into an appropriate SQL query and to query the remote database system 19b for the data requested by the server 17a. When the remote server 17b receives the queried information from database 20c or 20d in the remote database system 19b, the remote server 17b is configured to encrypt the information with the new encryption key sent to the server 17a and to transmit the encrypted information to the server 17a.

The server 17a may have to request information from multiple remote servers 17b in order to access all of the information requested by the client 14. Once, the server 17a has received all of the requested information, the server 17b is designed to assimilate all of the retrieved data into a form compatible with the client 14. Then, the server 17a is designed to encrypt the assimilated data with the new encryption key previously sent to the client 14 and to transmit the assimilated data to the client 14.

The client 14 is designed to receive the data transmitted from the server 17a and to decrypt the data using the new encryption key previously sent from the server 17a for the data session. The client 14 may then display the decrypted data to the user or process the data as may be desired.

It should be noted that although each message transmitted between the client 14 and server 17a is encrypted in the present invention, the encryption of each message is not necessary to implement the present invention. In this regard, any of the messages communicated between the client 14 and the server 17a can be without encryption, although the security of each message not encrypted may be compromised.

OPERATION

The preferred use and operation of the client/server system 10 and associated methodology are described hereafter with reference to FIGS. 1 and 4.

Initially, a user registers with the system 10 and receives a log name and a password. In addition, the password table 55 (FIG. 3) at each of the servers 17a and 17b is updated with the password and the log name. In this regard, an entry is created in the password table 55 at each of the servers 17a and 17b, and the password and the log name are entered into the entry. Furthermore, an alias password is assigned to the user which is also input into the entry in the password table. Next, the security data table 57 at each of the servers 17a and 17b is also updated by creating an entry for the user that indicates which data in the database systems 19a and 19b may be accessed by the user.

Figure 4A:
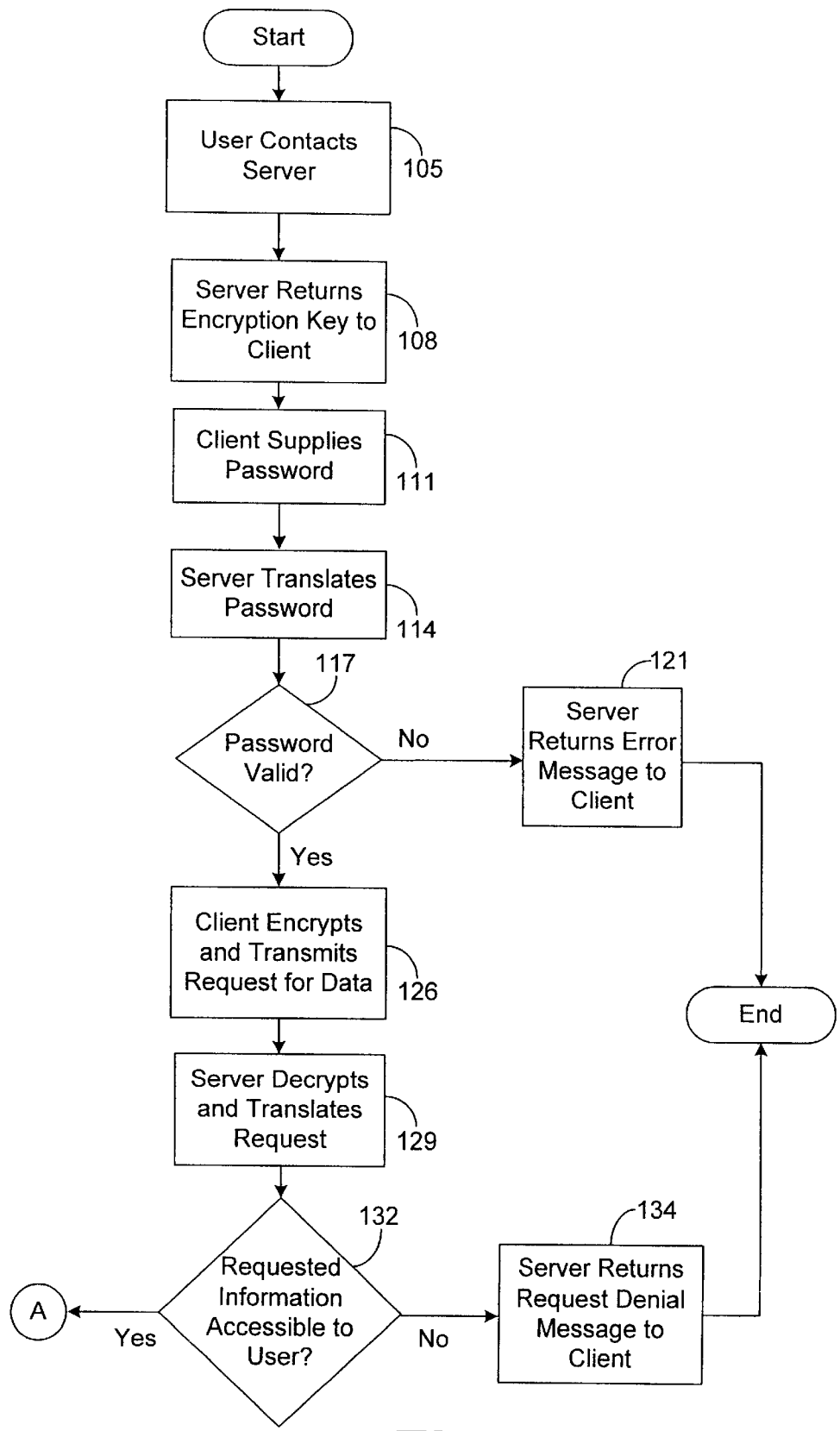
FIGS. 4A and 4B depict a flow chart illustrating the functionality and methodology of the client server system of FIG. 1.

Once the user is registered with the system 10, the user may establish communication with one of the servers 17a or 17b, as shown by block 105 of FIG. 4A. Assume for illustrative purposes that the user via client 14 establishes communication with the server 17a. As shown by block 108 of FIG. 4A, the server 17a then generates and transmits a new encryption key for the current data session to the client 14. The client 14 receives this new encryption key and uses the new encryption key to encrypt the data communicated by the client 14 in the remainder of the data session.

Preferably, the new encryption key is encrypted by server 17a before transmitting the new encryption key to the client 14. In this regard, the client 14 can be configured to transmit a public encryption key to the server 17a, through known encryption schemes, such as RSA encryption, for example. Before transmitting the new encryption key to the client 14, the server 17a encrypts the new encryption key with the public encryption key transmitted by the client 14. After receiving the new encryption key, the client 14 decrypts the new encryption key with a private key that corresponds with the public key used by the server 17a to encrypt the new encryption key. Thereafter, both the client 14 and server 17a have knowledge of the new encryption key and can encrypt/decrypt data transmitted therebetween with the new encryption key through known encryption schemes, such as DES encryption, for example.

After receiving the new encryption key from the server 17a, the client 14 encrypts the user's password and log name with the new encryption key and transmits the password and log name to the server 17a, as shown by block 111 in FIG. 4A. The server 17a receives and decrypts the log name and the password using the new encryption known by the client 14 and the server 17a. Utilizing a new encryption key unique for each data session frustrates attempts by hackers to spoof the server 17a with passwords and/or requests for data previously used in other data sessions.

The server 17a translates the password into an alias password by retrieving the alias password from the appropriate entry in the password data table 55, as depicted by block 114 of FIG. 4A. The server 17a compares the log name transmitted by the client 14 with the log name in the password data table entry corresponding with the password. If the log names match, the user of the client 14 is determined to be an authorized user. However, if the log names do not match, then the server 17a denies the client 14 access to the database system 19a. The server also sends the client an error message and terminates the data session, as shown by blocks 117 and 121 of FIG. 4A. Alternatively, the server 17a can be configured to allow the client 14 to send another password and/or log name.

Once the user is determined to be an authorized user, the user via client 14 encrypts and sends the server 17a a request for data, as depicted by block 126 of FIG. 4A. As mentioned hereinbefore, the request for data is preferably a data word or words indicating which data the user of the client 14 wishes to retrieve. In this regard, each data word is preferably a code word recognizable to the server 17a. Therefore, the client 14 preferably includes in memory 22 (FIG. 2) a list of code words that can be translated by the server 17a into a query to the database system 19a. The control system 21 (FIG. 2) preferably displays a list of options to the user through a menu or other type of suitable interface. The user selects a desirable option, and the control system 21 correlates the user's selection with the appropriate code word or words, which are then encrypted and transmitted to the server 17a. Alternatively, other techniques known in the art may be employed to generate a request for data by the client 14.

As shown by block 129 of FIG. 4A, the server 17a decrypts the request for data with the new encryption key and determines whether the user of the client 14 may access the requested data by consulting the security data table 57 (FIG. 3). If the client 14 has requested data inaccessible to the user of client 14, then the server 17a sends an appropriate message to the client 14 and denies access to the inaccessible data, as shown by blocks 132 and 134 of FIG. 4A. However, if the client 14 has requested accessible information, the server 17a translates the request into an appropriate SQL query (or other type of query compatible with the database system 19a) for retrieving the requested data from the database system 19a, as shown by block 139 of FIG. 4B.

The server 17a then connects to the database system 19a using the alias password retrieved from the password table 55 for the user of the client 14 (assuming that the database system 19a is a secure system requiring a password for access). The database system 19a, through techniques known in the art, then allows the server 17a to query for data that is determined by the database system 19a to be accessible for the alias password. After receiving an SQL query (or other type of query if SQL protocol is not being used) from the server 17a and determining that the SQL query is a request for accessible data, the database system 19a retrieves the data requested by the SQL query and transmits this data to the server 17a.

Since connectivity with the database system 19a is only established with the server 17a in the preferred embodiment, the database system 19a is isolated from outside sources (i.e., devices off of the premises of the server 17a). Accordingly, potential hackers are prevented from obtaining connectivity with the database system 19a, thereby frustrating attempts by the hackers to retrieve unauthorized data from the database system 19a.

It should be noted that the translation of the user password into an alias password as described hereinabove provides an extra level of security. As previously mentioned, it may be possible for an unauthorized user to discover an authorized user's log name and password. Therefore, if the unauthorized user manages to obtain connectivity with the database system 19a through a server not associated with the system 10, the password used by the unauthorized user to access the database system 19a should not be valid. This is because the database system 19a only recognizes the alias passwords contained in the server 17a. Since the alias passwords are preferably not transmitted across connections off of the premises of the server 17a (i.e., across connections accessible to the public), it is difficult for an authorized user to obtain the alias passwords. Accordingly, connectivity to the database system 19a should be denied unless the server 17a supplies the database system 19a with an alias password after the server 17a determines that the user is authorized to access the database system 19a.

It should be further noted that many database systems 19a have the capability to restrict a user's view of a table within a database 20a–20d to a particular column or columns, if desired. Therefore, when the user is connected to the database system 19a, the user can only see and retrieve data in a column accessible to the user. However, these database systems 19a typically fail to restrict the user's access of the data table according to the row number in the data table. Therefore, if a column includes both accessible data and inaccessible data, either the entire view of the column is blocked (thereby blocking access to the accessible information) or the column is accessible (thereby allowing the user to access or see the inaccessible information in the column).

However, in the present invention, the server 17a preferably acts as a liaison between the database system 19a and the client 14, and the server 17a only returns the requested data that is accessible to the user. Therefore, if some information in a column of a data table in the database system 19a is accessible and if some information in the column is inaccessible to the user, the server 17a retrieves only the accessible information from the database system 19a. As a result, the requested information can be returned to the client 14 by the server 17a without the user of the client 14 gaining access to the other information (e.g., the inaccessible information) in the column of the data table. Therefore, the server 17a of the present invention effectively limits the user's access to data in a data table down to the column and the row number of the data tables in the database system 19a.

There are numerous methodologies that the server 17a may employ to determine which rows are accessible to the user. For example, and in no way limited thereto, the security data table 57 may include predefined information indicating which rows within the database system 19a are accessible to a particular user. Therefore, before the server 17a issues a query to the database system 19a, the server 17a first consults the security data table 57 and determines whether the information requested by the client 14 is within rows accessible to the user of the client 14. If the server 17a determines that the information requested by the client 14 is within rows accessible to the user of the client 14, the server 17a submits a query to the database system 19a based on the request from the client 14. However, the server 17a discards any portion of the request from the client 14 that pertains to information determined to be inaccessible to the user of the client 14 before issuing a query. Therefore, only data that is accessible to the user of the client 14 is retrieved from the database system 19a in response to the request from the client 14.

To further illustrate the foregoing concept, assume that a data table in the database system 19a includes a plurality of rows and columns. For example, and in no way limited thereto, each row in the data table can represent a store within a chain of stores owned by a particular corporation. In other words, all of the information within each row of the data table pertains to a particular store within a chain of stores. Each column in the data table could correspond to a field of information relating to the stores in the data table. As an example, the fields may respectively indicate the store's street address, zip code, total costs, total revenue, etc.

Also, assume that it is desirable for a regional manager to only access the information in the data table pertaining to the stores within his region. In order to limit the manager's access to stores outside of his region, the security data table 57 may include an entry for the manager. In this entry, a list of all of the zip codes within the manager's region may be included. In other words, the zip codes may be used as an identifier to indicate which rows are accessible to the manager.

Therefore, when the server 17a receives a request from the client 14 for information within the database system 19a (when the manager is logged onto the client 14), the server 17a first consults the security data table 57 to determine which zip codes are accessible to the manager. Then, the server 17a restricts the query for only data that pertains to the accessible zip codes. In this regard, the server 17a inserts a "where" statement or an "if" statement to limit the data retrieved by the server 17a. For example, the query can be structured to return information from a row in the data table only where or only if the zip code field for the row includes a zip code listed as accessible within the security data table 57 for the identified user. By restricting the data retrieved from the data table in this way, the user can be prevented from accessing the data within any of the rows within the data table.

It should be noted that the server 17a can alternatively analyze the data retrieved from the database system 19a in order to restrict the user's access to certain rows of information. In this regard, the server 17a can consult the security data table 57 after retrieving the data requested by the client 14 to determine whether the retrieved data is accessible to the user of client 14, and the server 17a can be designed to discard any row having a zip code not identified as accessible to the user via the security data table 57. Therefore, the client 14 only receives data associated with rows determined by the server 17a to be accessible to the user of client 14. Other similar methodologies for restricting the user's access to certain rows within the data tables of the database system 19a may be employed without departing from the principles of the present invention.

Figure 4B:
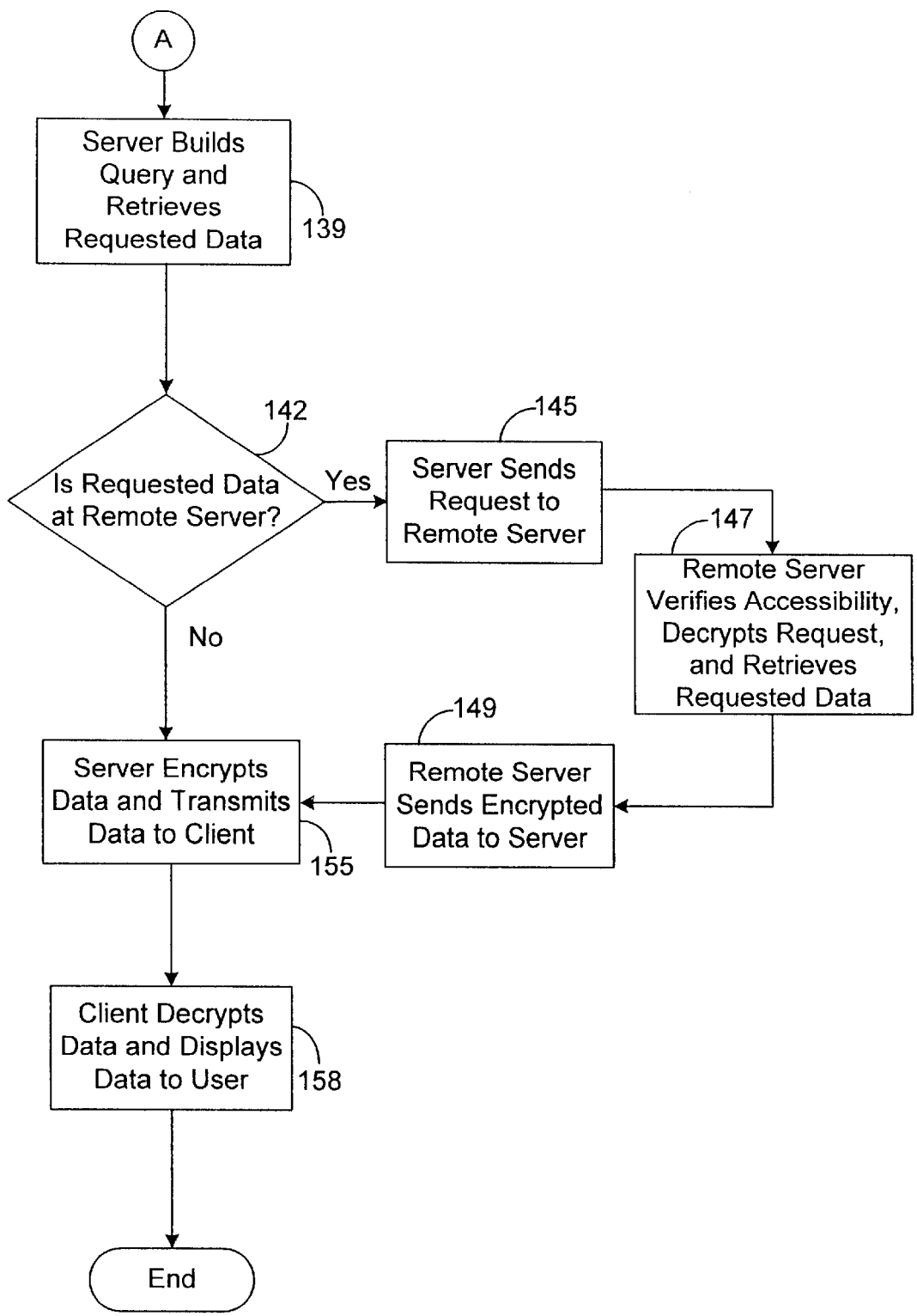

Once the server 17a receives the data from the database system 19a, the server 17a determines whether a remote server 17b has access to any of the requested data not included in the database system 19a, as depicted by block 142 of FIG. 4B. If so, the server 17a creates a request for data and submits the request for data to the appropriate remote server 17b just as the client 14 submitted its request for data to the server 17a, as shown by block 145. The remote server 17b may utilize some or all of the security features previously described for the server 17a. Therefore, after establishing a new encryption key for the data session between servers 17a and 17b, the server 17a transmits the user's log name and password to the remote server 17b. The remote server 17b verifies that the user is an authorized user and translates the password into an alias password. Then, the remote server 17b translates the request for data submitted by server 17a into an appropriate SQL query (or other type of query) for database system 19b. Using the alias password, the remote server 17b retrieves the requested data from database system 19b and transmits the requested data in encrypted form to the server 17a, as shown by blocks 147 and 149 of FIG. 4B. If the remote server 17b determines that any of the data is inaccessible to the user, the remote server 17b discards the inaccessible data before transmitting it to the server 17a.

After retrieving all of the requested data that is accessible to the user, the server 17a encrypts all of the retrieved data and transmits the encrypted data to the client 14, as seen in block 155 of FIG. 4B. The client 14 receives and decrypts the information transmitted by the server 17a. As shown by block 158 of FIG. 4B, the client 14 then displays the information to the user of client 14 or otherwise processes the information as desired.

Due to the security features described hereinabove, the database system 19a is effectively secured from access by unauthorized users. Therefore, remote access can be provided to remote clients 14 via the server 17a without jeopardizing the contents of the database systems 19a and 19b.

In concluding the detailed description, it should be noted that it will be obvious to those skilled in the art that many variations and modifications may be made to the preferred embodiment without substantially departing from the principles of the present invention. All such variations and modifications are intended to be included herein within the scope of the present invention, as set forth in the following claims.

Now, therefore, the following is claimed:

1. A system for preventing unauthorized access of database systems, comprising:
   a client configured to transmit a user password;
   a first server configured to establish a data session with said client and to receive said user password during said data session, said first server further configured to translate said user password into a different password during said data session by retrieving said different password from a password table based on said user password; and
   a database configured to receive said different password from said first server during said data session and to connect to said first server based on said different password.

2. The system of claim 1, wherein said different password identifies a user of said client.

3. The system of claim 1, wherein said server is configured to identify a user of said client based on said user password and said database is configured to identify said user based on said different password.

4. The system of claim 1, wherein said database is located at a premises of said first server and said client is located remotely from said first server.

5. The system of claim 1, wherein said password table has a plurality of entries, each entry of said plurality of entries correlating a respective user password with a respective different password, wherein said server is configured to access an entry in said password table based on said user password transmitted by said client.

6. The system of claim 1, wherein said database allows said first server to access information within said database based on said different password.

7. The system of claim 1, wherein said database is configured to determine whether a request for data is authorized based on said different password and to transmit data associated with said request for data in response to a determination that said request for data is authorized.

8. The system of claim 1, wherein said server is further configured to transmit said user password and wherein said system further comprises:
   a remote server configured to receive said user password from said first server and to translate said user password into another password; and
   a remote database configured to receive said other password from said remote server and to connect to said remote server based on said other password.

9. The system of claim 6, wherein said database requires a valid password to allow access to said information within said database.

10. The system of claim 7, wherein said server is configured to determine whether said request for data is authorized based on said user password and to transmit said request for data to said database in response to another determination that said request for data is authorized.

11. The system of claim 8, wherein said remote database allows said remote server to access information within said remote database based on said other password.

12. A system for preventing unauthorized access of database systems, comprising:
   means for transmitting a user password and a request for data from a client computer to a server computer in a data session between said server computer and said client computer;
   means for translating at said server computer said user password into a different password during said data session;
   means for utilizing said different password to access a database associated with said server computer during said data session;
   means for retrieving data from said database based on said request for data; and means for transmitting said data to said client computer during said data session.

13. The system of claim 12, further comprising:

means for identifying a user of said client computer based on said user password; and means for identifying said user of said client computer based on said different password.

14. The system of claim 12, further comprising:

means for transmitting said user password from said server computer to a remote server computer;

means for translating said user password into another password; and means for utilizing said other password to access said remote database.

15. The system of claim 12, further comprising a means for determining whether a current user of said client computer is authorized to retrieve said data based on said different password, wherein said retrieving means retrieves said data in response to a determination that said current user of said client is authorized to retrieve said data.

16. The system of claim 15, further comprising:

means for deciding whether said user is authorized to access information within said database based on said user password; and means for accessing said database in response to a determination that said user is authorized to access said information within said database.

17. The system of claim 16, wherein said client computer is remotely located from said server computer.

18. A method for preventing unauthorized access of database systems, comprising the steps of:

transmitting a user password from a client computer to a server computer in a data session between said client computer and said server computer;

translating, via said server computer, said user password into a different password during said data session;

utilizing said different password to authorize said server computer to access a database associated with said server computer during said data session;

retrieving data from said database; and transmitting said data from said server computer to said client computer during said data session.

19. The method of claim 18, further comprising the steps of:

identifying a user of said client computer based on said user password; and identifying said user of said client computer based on said different password.

20. The method of claim 18, further comprising the steps of:

transmitting said user password from said server computer to a remote server computer;

translating said user password into another password; and utilizing said other password to access said remote database.

21. The method of claim 18, further comprising the step of determining whether a current user of said client computer is authorized to retrieve said data based on said different password, wherein said retrieving step is in response to a determination that said current user of said client is authorized to retrieve said data.

22. The method of claim 21, further comprising the step of:

deciding whether said user is authorized to access information within said database based on said user password; and accessing said database in response to a determination that said user is authorized to access said information within said database.

23. The method of claim 22, wherein said client computer is remotely located from said server computer.

* * * * *